United States Patent
Sonoura

(10) Patent No.: US 8,218,816 B2
(45) Date of Patent: Jul. 10, 2012

(54) MOVING OBJECT DETECTING DEVICE AND MOBILE ROBOT

(75) Inventor: Takafumi Sonoura, Fuchu (JP)

(73) Assignee: Kabushiki Kaisha Toshiba, Toyko (JP)

( * ) Notice: Subject to any disclaimer, the term of this patent is extended or adjusted under 35 U.S.C. 154(b) by 961 days.

(21) Appl. No.: 12/196,376

(22) Filed: Aug. 22, 2008

(65) Prior Publication Data

US 2009/0052740 A1 Feb. 26, 2009

(30) Foreign Application Priority Data

Aug. 24, 2007 (JP) .............................. P2007-218090

(51) Int. Cl.
G06K 9/00 (2006.01)

(52) U.S. Cl. ...................................................... 382/103

(58) Field of Classification Search .................. 382/103, 382/104, 106, 153; 348/135, 169; 700/245, 700/253–255, 259
See application file for complete search history.

(56) References Cited

U.S. PATENT DOCUMENTS

| 5,696,503 A * | 12/1997 | Nasburg .......................... 340/933 |
| 6,191,704 B1 * | 2/2001 | Takenaga et al. .............. 340/903 |
| 7,158,075 B2 * | 1/2007 | Nakamura ....................... 342/70 |
| 7,983,817 B2 * | 7/2011 | Breed .............................. 701/45 |
| 2005/0246065 A1 * | 11/2005 | Ricard ............................ 700/258 |

FOREIGN PATENT DOCUMENTS

| JP | 2004-198323 | 7/2004 |
| JP | 2005-297648 | 10/2005 |
| JP | 2007-015676 | 1/2007 |

* cited by examiner

Primary Examiner — Jason M Repko
Assistant Examiner — Shervin Nakhjavan
(74) Attorney, Agent, or Firm — Turocy & Watson, LLP

(57) ABSTRACT

A moving object detecting device measures a congestion degree of a space and utilizes the congestion degree for tracking. In performing the tracking, a direction measured by a laser range sensor is heavily weighted when the congestion degree is low. When the congestion degree is high, a sensor fusion is performed by heavily weighting a direction measured by a image processing on a captured image to obtain a moving object estimating direction, and obtains a distance by the laser range sensor in the moving object estimating direction.

7 Claims, 9 Drawing Sheets

MOVING OBJECT DETECTING DEVICE AND MOBILE ROBOT

RELATED APPLICATION(S)

The present disclosure relates to the subject matters contained in Japanese Patent Application No. 2007-218090 filed on Aug. 24, 2007, which are incorporated herein by reference in its entirety.

FIELD

The present invention relates to a mobile robot, a sensor, a system and a method for controlling the mobile robot.

BACKGROUND

As a method for detecting and tracking a position of a moving object (for example, a person) that freely moves around in a space, there are proposed methods implemented with an image processing utilizing a camera image and a detecting method utilizing a range sensor, such as a laser range sensor.

In a method for tracking the moving object using the range sensor, a shape of an object and a time continuity of a position and a velocity of the object are utilized. However, according to the conventional tracking method, it is difficult to specify what type of physical object the object belongs to. For this reason, reliability in tracking the object becomes deteriorated when used in an environment congested with a plurality of objects.

Therefore, there has been proposed a method using a continuity of a laser reflection intensity in grouping detected points measured by a laser range sensor. An example of such method is disclosed in JP-A-2004-198323.

On the other hand, by employing the method using an image processing, tracking while specifying a target object can be performed. However, it is difficult to accurately specify a position of the target object due to a matching accuracy, a misrecognition, and a resolution of a camera sensor.

In order to solve the problems, there is used a method called "sensor fusion", in which a multiple sensors are employed for combining advantages of each of the sensors. However, there has not been established a robust tracking method for tracking a moving object that irregularly moves at a high speed in an environment where a plurality of objects exist.

There has been proposed a method using a sensor fusion unit that employs distance and azimuth information output from a radar to a determination result of an image processing of a captured image. An example of such method is disclosed in JP-A-2005-297648. There is also proposed a method that changes a weight for image information in accordance with a brightness level of a surrounding circumstance. An example of such method is disclosed in JP-A-2007-015676 (counterpart U.S. publication is: US 2006/0274149 A1).

In the document JP-A-2004-198323, in a case in which a measuring surface of the target object is not uniform, a tracking performance becomes deteriorated. Accordingly, the method may only be suitable for tracking an object having a predetermined shape and size, such as a vehicle. Moreover, the method is not suitable for tracking an object in a situation where other objects exist near the target object, as such in a so-called congested situation.

In measuring a distance using a stereo image processing, in addition to affection due to image processing, such as misdetection and matching error, a quantization error caused by a pixel density of a camera sensor will affects the measurement result. Depending on a type of a camera sensor to be used or a parallax of the camera sensor, accuracy in a stereo viewing measurement of an object placed at a distance of several meters reaches several tens of centimeters in some cases. In the method described in the document JP-A-2005-297648, although the misdetection can be checked, a resolution cannot be obtained beyond a camera image processing so that tracking for a high speed operation cannot be performed.

In the sensor fusion system based on a captured image as those disclosed in the document JP-A-2007-015676, there is a problem in that an operating performance cannot be basically expected beyond a camera image processing and an operation in a congested environment is also difficult to perform.

SUMMARY

According to a first aspect of the invention, there is provided a moving object detecting device including: an image capturing unit that captures an image of a circumference of the device; a range sensor that scans the circumference of the device and measures a distance from the device to an object; an image processing unit that performs an image processing on the image captured by the image capturing unit to extract a tracking target, which is a moving object to be tracked, from the image and to estimate a distance and a direction from the device to the tracking target based on the image; a congestion degree measuring unit that sets a congestion degree measuring region around a moving object estimated point where a moving object is previously detected and measures a congestion degree represented by a ratio C of the number of detection points detected by the range sensor of the number of detection points detected by the range sensor in the congestion degree measuring region to a total number of scanning lines of the range sensor passing through within the congestion degree measuring region; and a calculation unit that obtains a fusion estimation result by performing a calculation using (a) a first moving object tracking result obtained by an output from the range sensor, (b) a second moving object tracking result obtained by the image processing by the image processing unit, and (c) a fusion ratio $W_1$ that is represented by the following expression (1) where $\alpha$, $\beta$, and n are arbitrary constant.

$$W_1 = \alpha C^n + \beta \tag{1}$$

According to a second aspect of the invention, there is provided a mobile robot including: the moving object detecting device according to the first aspect; a drive unit that drives the robot to move on a floor; and a controller that controls the drive unit to move the robot to follow the tracking target by referring to a tracking target estimating position that is obtained as the fusion estimation result by the calculation unit of the moving object detecting device, wherein the calculation unit dynamically changes a follow-up gain G for tracking the tracking target to satisfy the following equation (2), where R ($0<R<1$) represents a reflection intensity of a scanning beam of the range sensor, and a second fusion ratio $W_2$ satisfies the following equation (3), where $\alpha_2$, $\beta_2$, and $n_2$ are arbitrary constant.

$$G \propto W_1 W_2 \tag{2}$$

$$W_2 = \alpha_2 R^{n_2} + \beta_2 \tag{3}$$

DETAILED DESCRIPTION OF THE EMBODIMENTS

An embodiment of the present invention will be described below with reference to the accompanying drawings.

Figure 1:
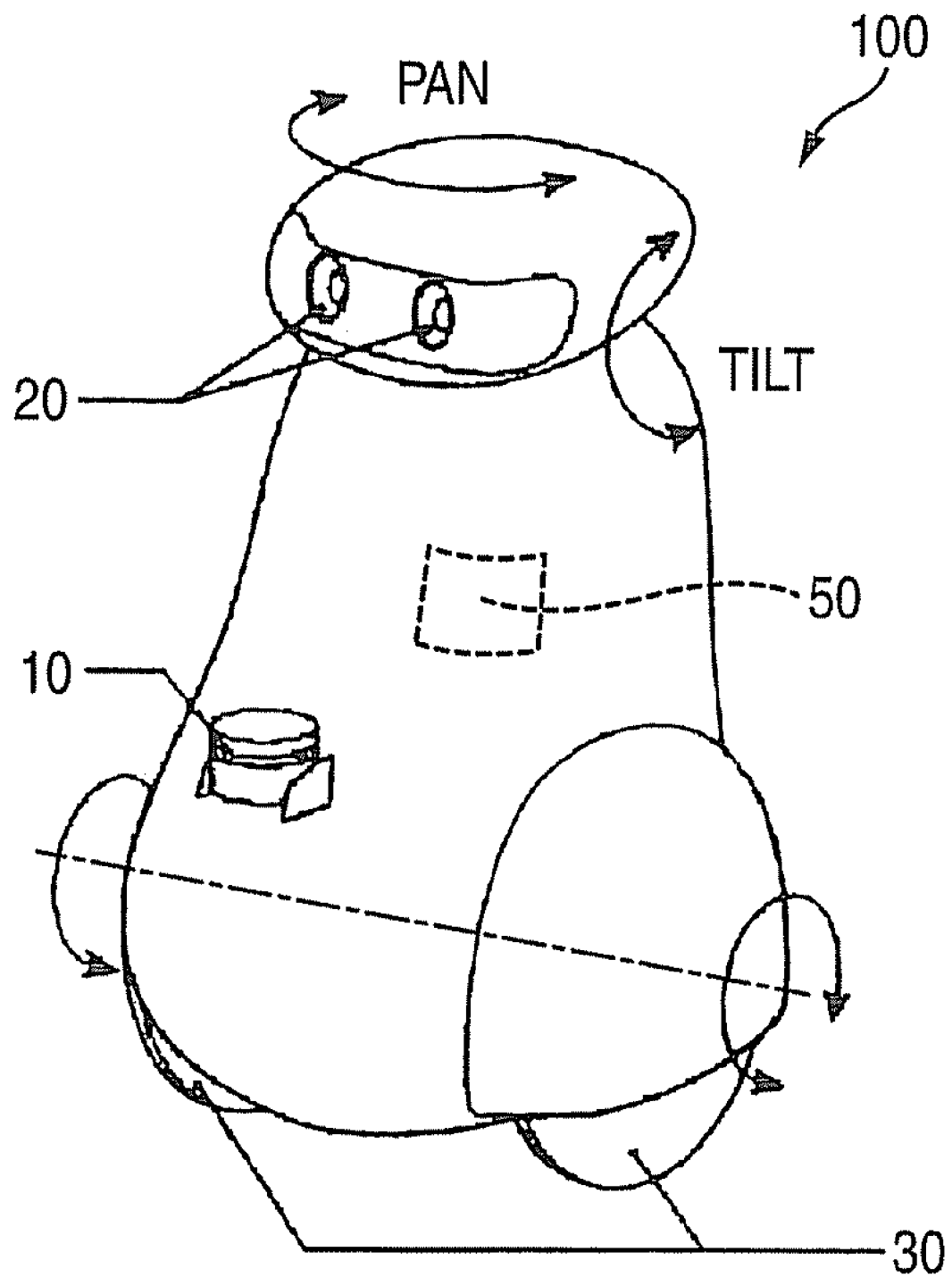
FIG. 1 is a view showing a typical configuration of a robot for detecting a moving object according to an embodiment of the present invention.

FIG. 1 is a view showing a schematic configuration of an autonomic mobile robot including the moving object detecting device according to the present invention.

A mobile robot 100 includes a laser range finder 10 and a pair of cameras 20 that serve as external sensors. The cameras 20 are disposed in a state in which optical axes are in parallel with each other, and a camera system for obtaining a stereo image is configured. The cameras 20 are disposed in a head part of the mobile robot 100. The head part of the mobile robot 100 is movable in a pan direction and a tilt direction independent from a body part of the mobile robot 100.

The mobile robot 100 is provided with a processor 50 that performs processing for tracking a target object (moving object), which will be described in detail later. The processor 50 serves as an image processing unit, a congestion degree measuring unit, a calculation unit, and a controller.

Drive wheels 30 supported on left and right axles is provided in a bottom portion of the body part of the mobile robot 100. By rotating the drive wheels 30, the mobile robot 10 performs various movements such as forward and rearward movement and a rotating movement for freely moving around in a space.

The mobile robot 100 has the function of detecting a moving object. Based on information obtained by this function, it is possible to perform various operations such as avoiding a collision with the moving object and following the moving object.

The mobile robot 100 uses azimuth (direction) and distance data obtained by the laser range finder 10 and azimuth and distance data obtained by an image processing for image data through the stereo cameras 20 in order to detect the moving object.

Object Tracking by Image Processing

The mobile robot 100 according to the embodiment is configured to perform a measurement of a distance and an azimuth and tracking of a target through a stereo image processing for an image captured by the cameras 20 in addition to a measurement by the laser range finder 10. Image data acquired by the stereo cameras 20 are subjected to an image processing and a target moving object to be tracked is thus detected. For the image processing, it is possible to use a well-known tracking method. For example, feature points for edges and corners of an object in an image are detected, and matching for the feature thus detected is performed. The tracking is performed by setting, as a tracking target, a specific feature point or a feature point group obtained in the image processing and an azimuth angle of a target is measured through a position in a field-of-view of the camera and a distance to the target is measured through stereo parallaxes of two camera images.

Object Tracking by Range Sensor

The laser range finder 10 is used for stereo viewing through the stereo cameras 20 and as a range sensor of the mobile robot 100, and has a high resolution and accuracy in a measurement together with an angle direction and a distance direction. According to the laser range finder 10, a distance to the nearest obstacle (object) in a certain direction component can be measured based on surrounding information.

In the moving object detecting device according to the embodiment, it is possible to detect and follow a moving object by utilizing the laser range finder 10.

Figure 2:
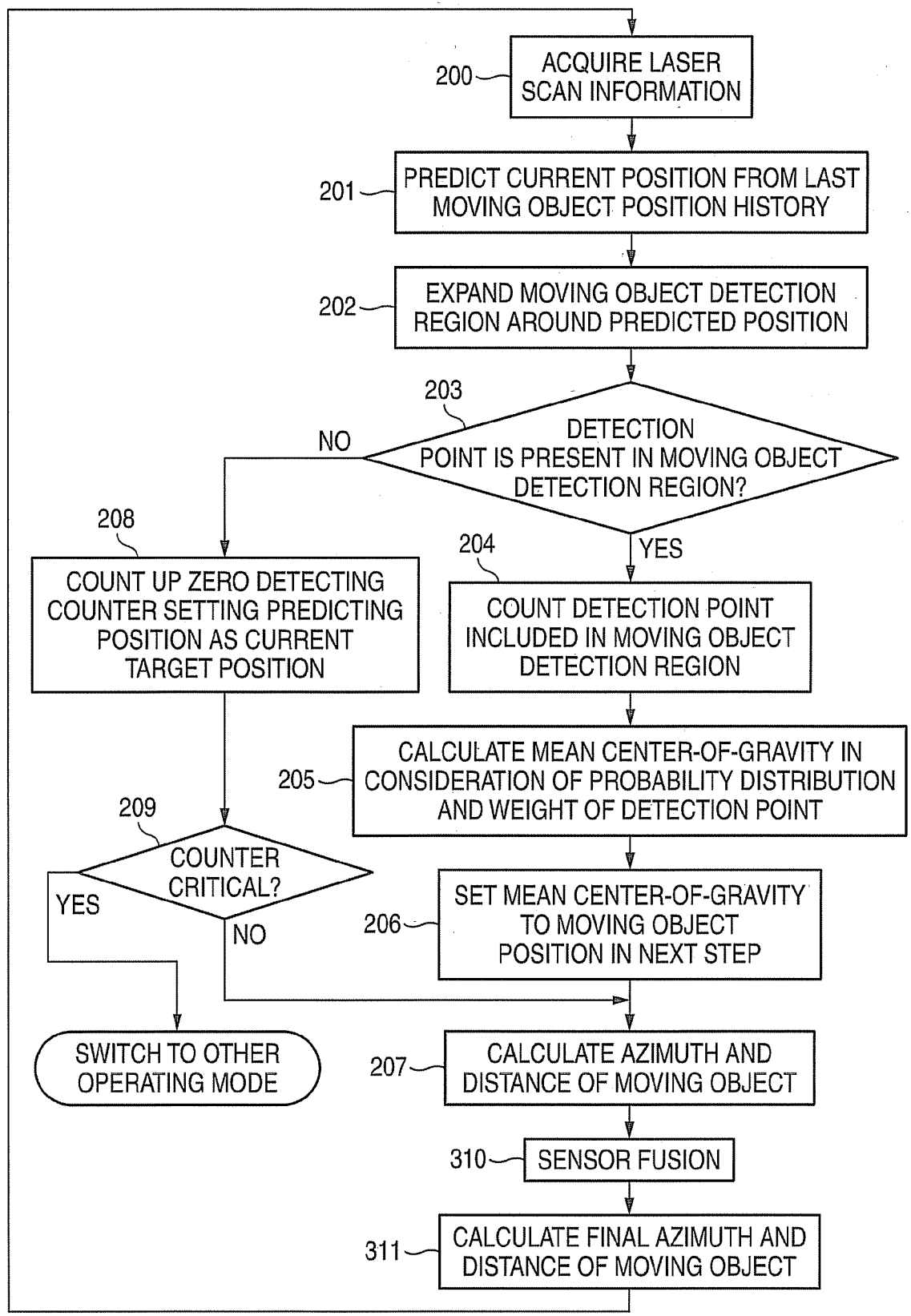
FIG. 2 is a flowchart showing a flow of tracking the moving object through a laser range finder.

FIG. 2 is a flowchart showing a flow of the tracking for the moving object by utilizing the laser range finder 10.

First, the laser range finder 10 scans a laser beam to acquire information (Step 200). Next, a current velocity vector of the moving object is obtained from a past measuring estimation history of the tracking target for a last predicting position of the moving object to be the tracking target based on the scan information and a current position is predicted (Step 201).

Figure 3:
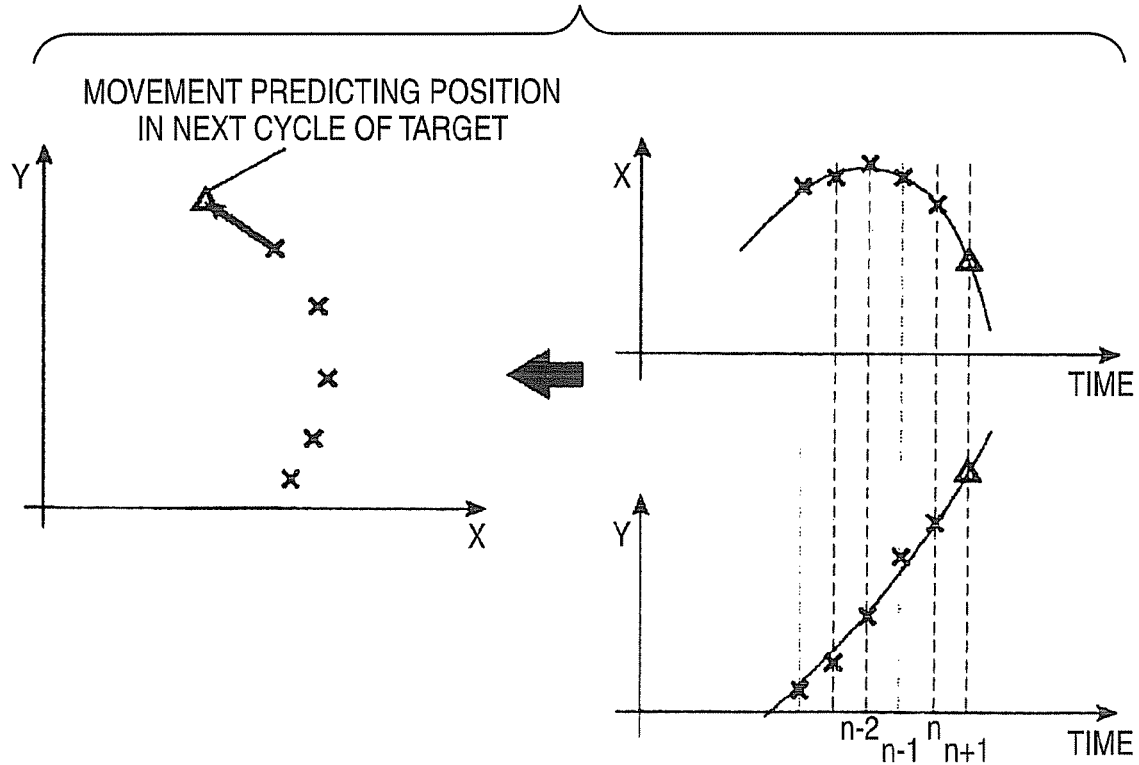
FIG. 3 is a chart for explaining a prediction of a movement of the moving object.

Subsequently, the last predicting position is moved to a movement predicting position in a next cycle. As shown in FIG. 3, the velocity vector can be obtained through a linear interpolation by simply using position information about n and n−1 steps of each of X and Y axes in a moving plane. It is also possible to obtain a velocity vector and a next step predicting position by a higher order polynomial through the least squares method using last several points.

Expansion of Moving Object Detection Region

Figure 4:
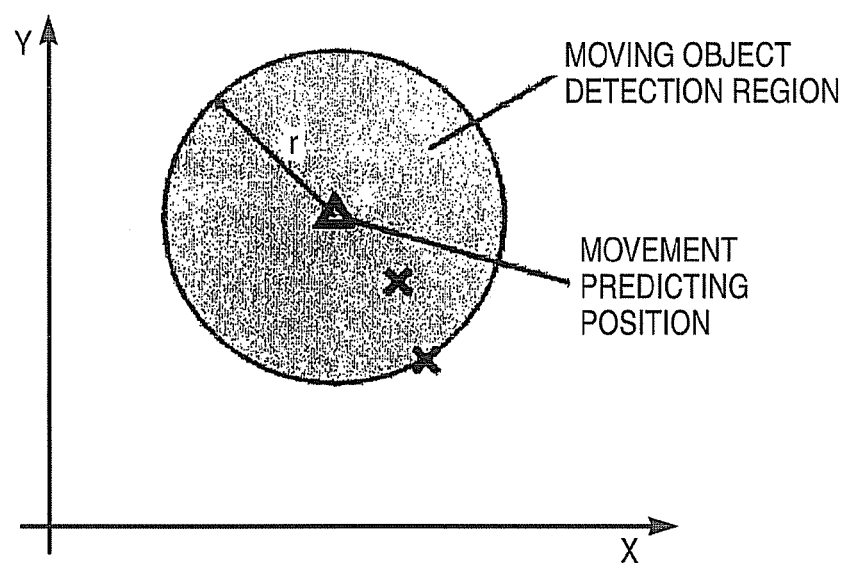
FIG. 4 is a chart for explaining a detection region of the moving object.

Referring to FIG. 4, a moving object detection region will be described. When the moving predicting position of the moving object is learned, a circular region having a radius r is subsequently expanded around a next step movement predicting position of a tracking target and an inner part of the region is set to be a moving object detection region used in a next step (Step 202).

In a case in which a type of the moving object is known, for example, in a case where the moving object to be the tracking target is a person, a maximum velocity distance is set to be the radius r of a circular region. The maximum velocity distance is a distance in a unit of time at a maximum velocity, which can be output from the target object. In the case in which the tracking target is not known, a provisional output enabling maximum velocity distance is obtained by multiplying a maximum velocity distance of the tracking target measured in the past by a certain coefficient and is set to be the radius r of the circular region.

Detection Region after Correction of Current Velocity

Figure 5:
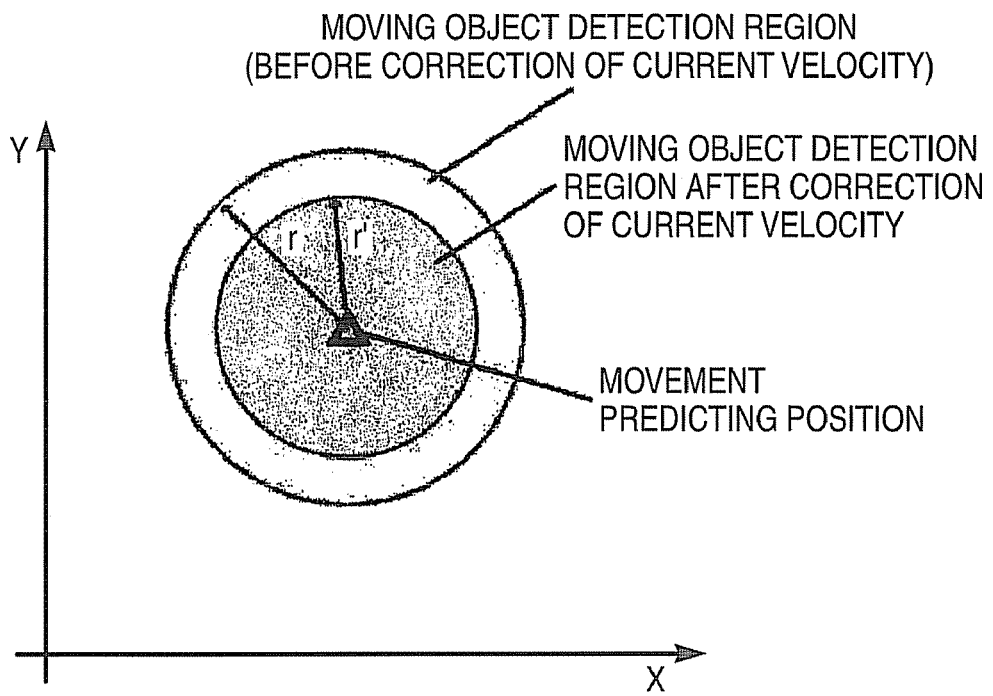
FIG. 5 is a chart for explaining a detection region obtained after correcting a current velocity of the moving object.

FIG. 5 is a chart for explaining a detection region after a correction of a current velocity for the moving object. When a current estimating velocity of the moving object is represented by V and an output enable maximum velocity distance of the tracking target is represented by Vmax, the radius r of the circular region is corrected in the following equation (1), where γ is a constant value satisfying γ<r.

$$r'=r-\gamma(1-|V|/V\max) \quad (1)$$

In the description, the term "velocity" is used for a moving amount per unit measuring cycle. Consequently, it is possible to avoid an erroneous determination of a detection point in an excessive region while conforming to every motion which can be taken by the tracking target.

Detection Region after Correction of Moving Direction

Figure 6:
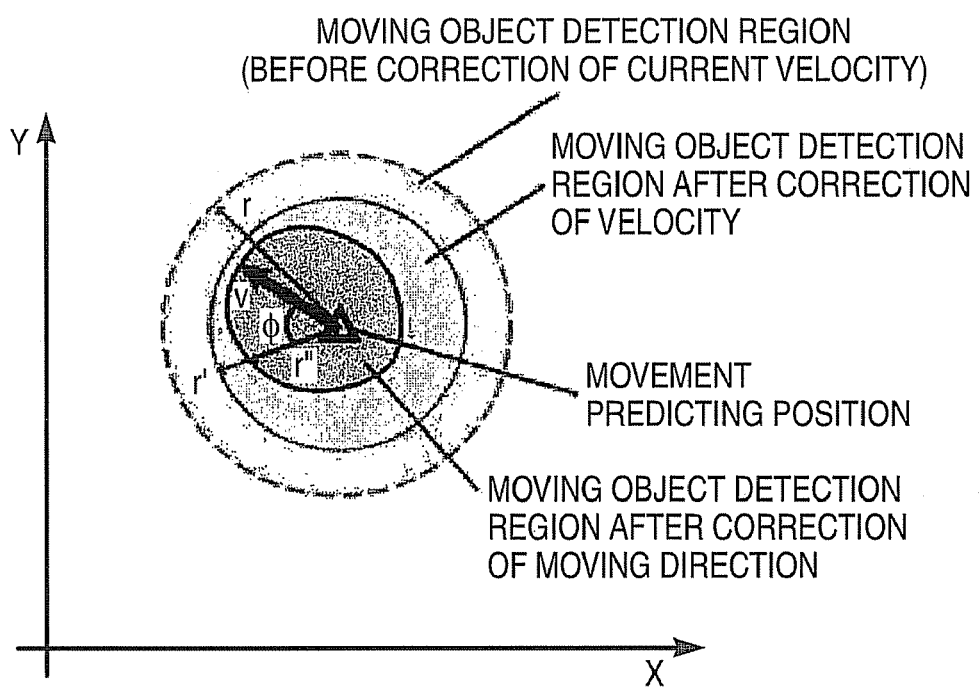
FIG. 6 is a chart for explaining a detection region obtained after correcting an moving direction of the moving object.

With reference to FIG. 6, next, description will be given to a correction of a detection region in consideration of a moving direction of the moving object. Referring to a circular region prepared as a moving object detection region, when a current estimation velocity of the moving object is represented by V and the output enable maximum velocity distance of the tracking target is represented by Vmax, a vector r'(φ) (where 0≦φ<2π; and |r'| is radius) forming the circular region is corrected into r'' by the following equation (2), and a correction region formed by r'' is set to be the moving object detection region.

$$\vec{r}'' = \xi\left\{1 + \zeta\left(\frac{|\vec{V}|}{V\max}\right)^m \left(\frac{\vec{r}'\cdot\vec{V}}{|\vec{r}'||\vec{V}|}\right)\right\}^n \vec{r}' \quad (1 \geq \zeta \geq 0) \quad (2)$$

In the equation (2), ζ satisfies (1≧ζ≧0) and ξ, ζ, m, and n are arbitrary real numbers that satisfy the above condition.

This utilizes some velocity continuity in the operation of the moving object. In the equation (2), $$\frac{\vec{r}'\cdot\vec{V}}{|\vec{r}'||\vec{V}|}$$

represents an effect of a directivity in a velocity vector direction, and a velocity effect of the target is expressed by a portion of $$\frac{|\vec{V}|}{V\max}.$$

The effect of the directivity implies that a width of the detection region is increased in the velocity vector direction and is reduced in a reverse velocity vector direction. The velocity effect represents that the correcting effect is produced more greatly when the velocity of the target is higher. Consequently, it is possible to perform detection with higher accuracy in consideration of a current moving velocity and direction of the moving object.

Detection Region after Correction of Relative Movement

Figure 7:
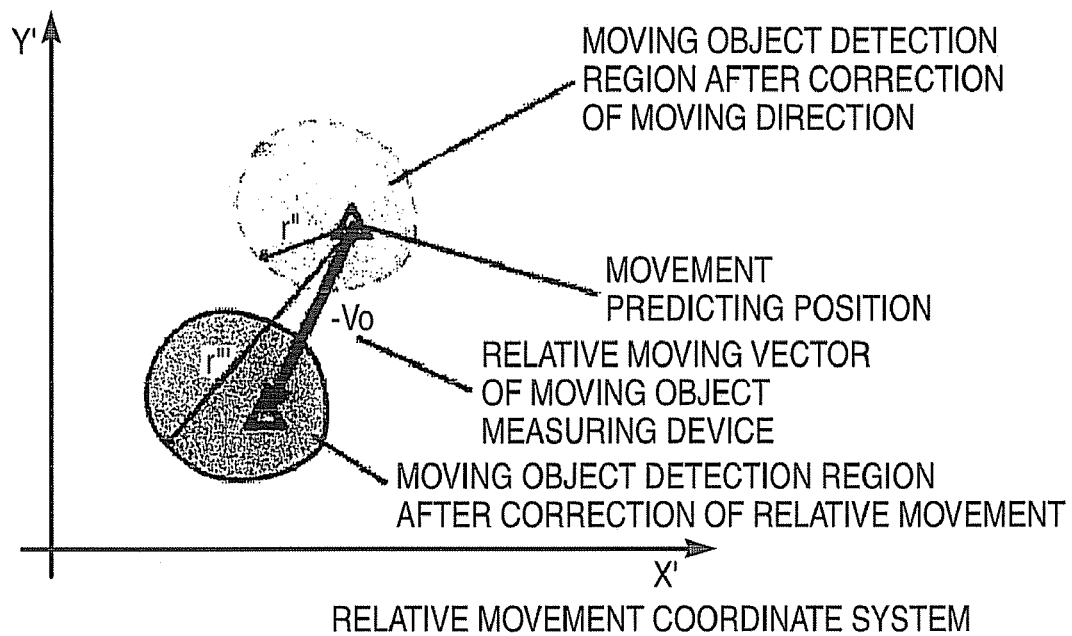
FIG. 7 is a chart for explaining a detection region obtained after correcting a relative movement of the moving object.

With reference to FIG. 7, description will be given to a detection region obtained after the correction of a relative movement of the moving object in consideration of the case in which the moving object detecting device (the mobile robot 100) itself is moved.

In a case in which the moving object detecting device itself is moved at V0, it is suitable to perform a correction into r''' that satisfies $$\vec{r}^m = \vec{r}^n - \vec{V}_0$$

and to set a correction region formed by r''' as the moving object detection region.

Consequently, it is possible to enhance a detection rate in a relative motion in which the moving object detecting device itself is moved in the case in which a laser range finder is mounted on a mobile robot. At this time, the moving velocity V0 can be measured by a sensor which is prepared separately. For example, in the mobile robot shown in FIG. 1, it is possible to measure the velocity by utilizing an odometry of an encoder capable of measuring a rotating amount of an axle provided in both wheels, and furthermore, using a well-known inertia sensor.

Detection Region Considering Laser Scan

Figure 8:
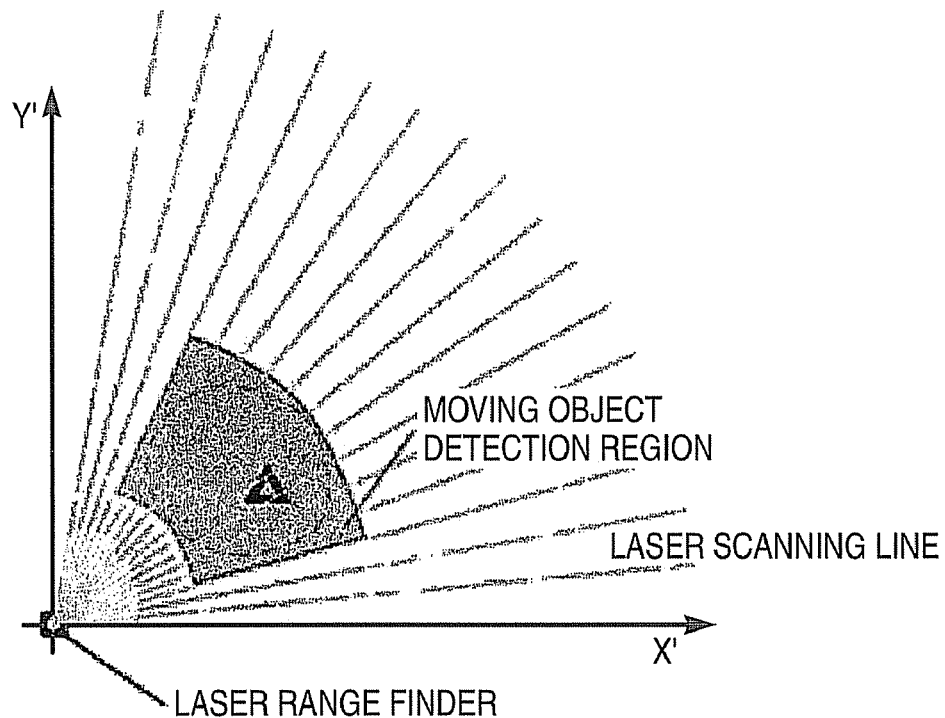
FIG. 8 is a chart for explaining a sector detection region of the moving object.

With reference to FIG. 8, description will be given to a moving object detection region in consideration of a scanning system of a laser. In a measurement of a distance through the laser range finder, a scan is performed over an optional plane radially around a laser light emitting source. In the embodiment, as shown in FIG. 8, a sector including a correction region as shown in FIG. 8 is set to be a final moving object detection region so that a calculation load can be reduced.

Detected Points Detected by Laser Range Finder

In a case in which a point detected by the laser range finder is present in the moving object detection region defined as shown in FIG. 8, the point is regarded to be a detection point responding to a target moving object (Step 203). Herein, all of points responding in the detection region are regarded to be points responding to a moving target and are counted (Step 204).

Estimation of Position Through Mean Center-of-Gravity

Figure 9:
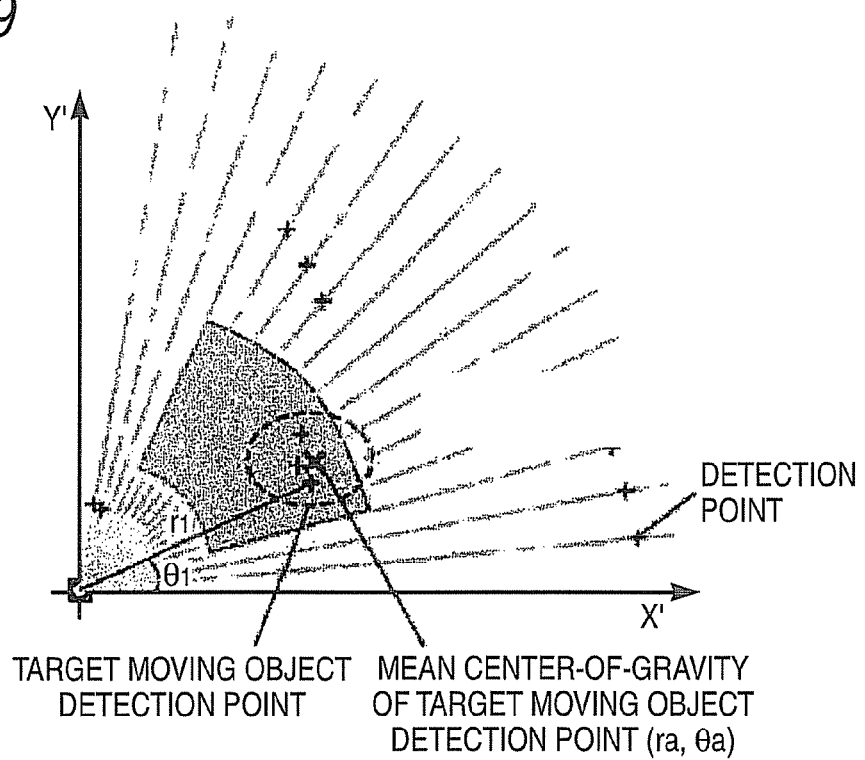
FIG. 9 is a chart for explaining a position estimation of a target moving object.

With reference to FIG. 9, description will be given to an estimation of a position of a target moving object depending on a mean center-of-gravity.

A mean center-of-gravity of all of the detection points present in the detection region in data in one scan is set to be an estimation position ($r_a$, $\theta_a$) of a current step of the target moving object which is being tracked (Step 205).

The coordinates $r_a$ and $\theta_a$ are expressed in the following equations (3) and (4). Although they are expressed in a polar coordinate system, they may be expressed in another coordinate system such as the Euclidean coordinate system.

$$r_a = \frac{\sum_{i=1}^{n} r_i}{n} \quad (3)$$

$$\theta_a = \frac{\sum_{i=1}^{n} \theta_i}{n} \quad (4)$$

In a process for setting the moving object detection region, a correction is performed in consideration of the moving velocity of the tracking target itself or a relative velocity relationship with the laser range finder so that the measuring position of the detection point of the moving object is predicted. It is possible to suppose that a detection region expanding reference point has the highest presence possibility in the detection region and the presence possibility is reduced from the reference point to the surroundings.

Therefore, in the moving object detecting device according to the embodiment, a weighting calculation is performed in the mean center-of-gravity calculation using the following equation (5).

$$x = \frac{\sum_{i=1}^{n}(P_i \cdot x_i)}{\sum_{i=1}^{n} P_i} \quad (5)$$

Figure 10:
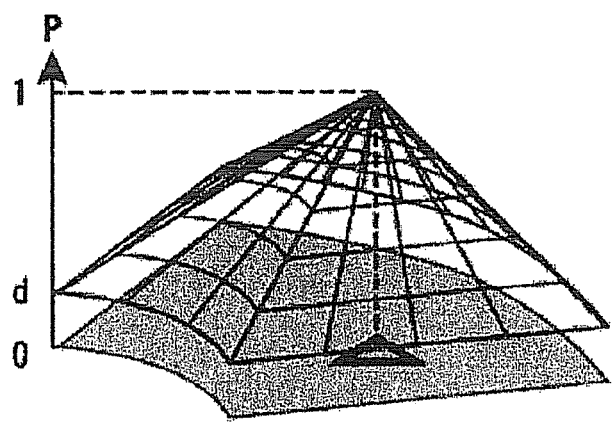
FIG. 10 is a chart for explaining a detection region of the moving object which is weighted through a probability distribution.

A weight $P_n$ of a detection point $x_n$ is expressed as $P_n=(1-d)(1-r_n/rz_n)+d$. Herein, $r_n$ represents an expanding reference point of a moving object detection region and $rz_n$ represents an intersection of a straight line passing through the detection point $x_n$ from the expanding reference point and an outer periphery of the detection region, and d represents an optional constant to satisfy $0<d<1$ and indicates an offset. By performing the weighting, a moving object detection region shown in FIG. 10 is obtained. The moving object detection region in which the weighting is performed based on a probability distribution as shown in FIG. 10 is so-called linear type weighting and a vertical direction represents a weight on a presence probability basis.

Figure 11:
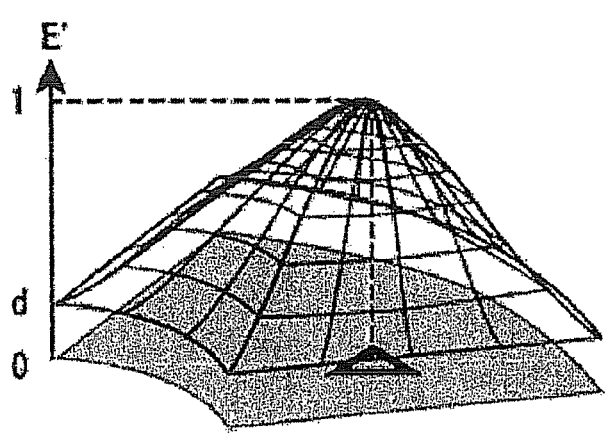
FIG. 11 is a chart for explaining a detection region of the moving object which is weighted through the probability distribution.

As shown in FIG. 11, moreover, weighting of a normal distribution type can be performed as a weight function. It is also possible to estimate a position x of the tracking target as in the following equation (6) by using a probability distribution function, for example, "$E'_{\sigma_r}(r)=(1-d)E_{\sigma_r}(r)+d$" based on a normal distribution function $E_{\sigma_r}(r)$ setting a variance "$\sigma_r=\sqrt{r_{zn}}$" and an offset d.

$$x = \frac{\sum_{i=1}^{n}(E'_{\sigma_r}(r_i) \cdot x_i)}{\sum_{i=0}^{n} E'_{\sigma_r}(r_i)} \quad (6)$$

In order to reduce the calculation load, moreover, it is also possible to employ an algorithm in which weighting is reduced when $|r-r_a|$ and $|\theta-\theta_a|$ are increased by causing r and θ to be adapted to a divergence degree from $r_a$ and $\theta_a$ in consideration of the feature of the polar coordinate system, respectively.

When a change in the weighting is excessively increased, actually, there is a high possibility that tracking target information to be detected might not be detected to fail in tracking. For this reason, large amount of weighting cannot be applied. To the contrary, if the change in the weighting is reduced so that the presence probability is uniform, there is a trade-off that a high possibility that another object in the vicinity of the tracking target might be erroneously recognized as the tracking target.

The mean center-of-gravity which is calculated is set to be a position of the moving object at a next tracking step (Step 206). Subsequently, an azimuth and a distance of the moving object having the position set are calculated (Step 207).

In the case in which an estimation position candidate point cannot be detected in the moving object detection region, a moving object predicting position in a next cycle which is set to be the expanding reference point of the moving object detection region is exactly set to be a current tracking target estimating position. Thereafter, a lost counter for recording the number of times that the estimating position candidate point is not detected continuously is added and a tracking processing in a next step is continuously performed (Step 208).

Subsequently, the lost counter value is compared with a predetermined threshold (Step 209). If the lost counter value is not critical with the threshold or smaller, the azimuth and the distance of the moving object having the position set are calculated (Step 207).

On the other hand, if the threshold is exceeded, the mobile robot stops the tracking and follow-up operations in the past and carries out a transition to a completely different operating configuration. As another operating configuration, for example, the body is turned in that place or a neck is moved in a horizontal direction so that a camera disposed in the head portion is shaken in a pan direction. A matching search with an image template of the tracking target which has been recorded is performed based on an image acquired at this time. In the case in which a person to be tracked carries a marker or a transmitter, furthermore, it is also possible to make a search by utilizing a sensor provided in an environment, thereby acquiring an approximate position and to perform a movement to the vicinity thereof, thereby making the template matching search.

The lost counter is cleared to zero when the estimating position candidate point is detected in the moving object detection region in each tracking processing.

Learn of Spatial Congestion Degree

The mobile robot according to the embodiment is particularly intended for following a person in the moving object tracking. In case of a person follow-up, an operation of the person to be a tracking target cannot be performed at a high speed by surrounding influence in a congested environment. Referring to the follow-up operation of the mobile robot, necessarily, a high speed operation is not required as in an open space. In the mobile robot according to the embodiment, therefore, importance is attached to camera information to reliably perform an operation at a low or medium speed in the congested environment. On the other hand, such a sensor fusion processing as to quickly perform an operation based on high accuracy position measuring information of the laser range finder is executed in the open space in which very few people are present.

First, a spatial congestion degree around the tracking target is indexed in order to implement a seamless transition between the camera information and the laser range finder information. By fusing both of the information based on the index changed continuously, it is possible to smoothly perform the transition between both of the information.

Figure 12:
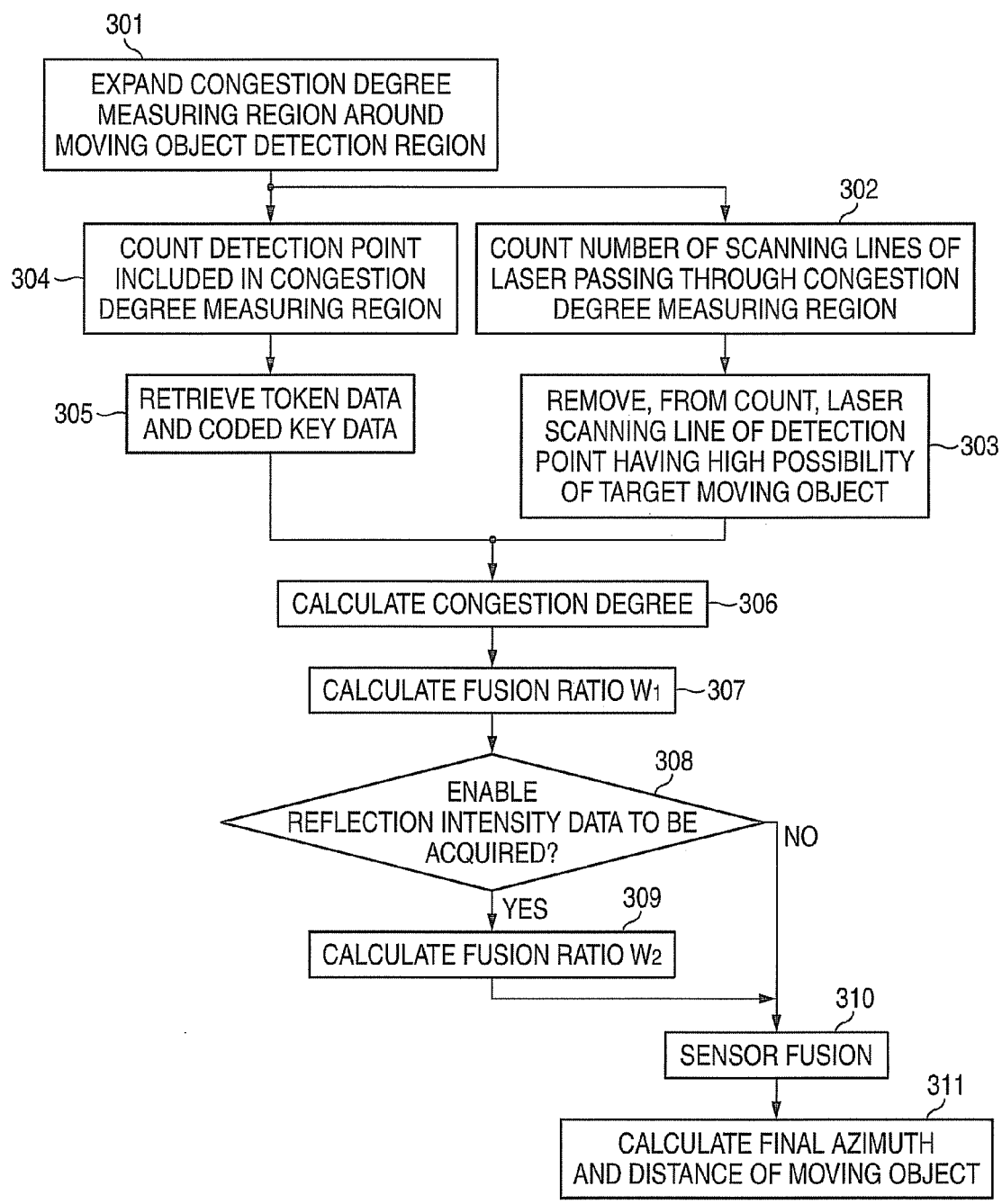
FIG. 12 is a flowchart showing a processing procedure for learning a congestion degree.

FIG. 12 is a flowchart showing a processing procedure for learning a spatial congestion degree to be a fusion index of the sensor fusion processing (which will be hereafter referred to as a congestion degree).

Figure 13:
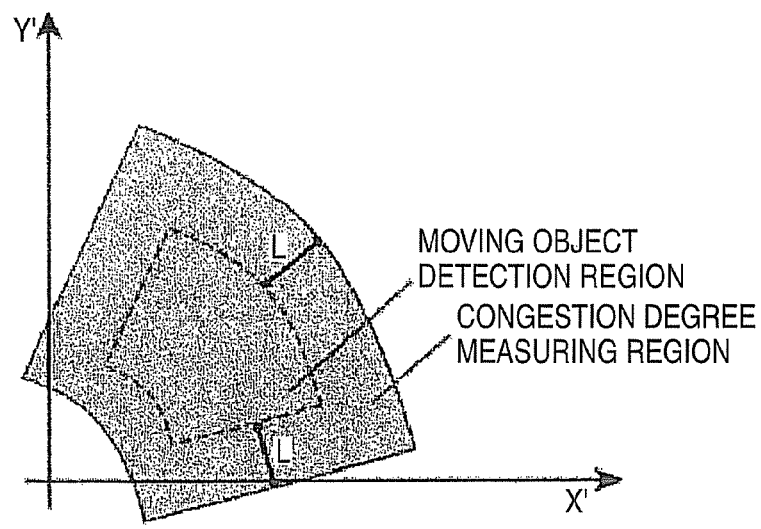
FIG. 13 is a chart for explaining a congestion degree measuring region.

First, a further expanded range is prepared as a congestion degree measuring region around the moving object detection region used in the past (Step 301). FIG. 13 is a chart for explaining the congestion degree measuring region. The congestion degree measuring region is expanded by a distance L outward in a normal direction from the moving object detection region as shown in FIG. 13.

Subsequently, there is counted the number of scanning lasers of the laser range finder which pass in the congestion degree measuring region (Step 302). Next, the congestion degree is determined by a ratio of the number of lasers detecting an object in the congestion degree measuring region to the number of the scanning lasers.

Figure 14:
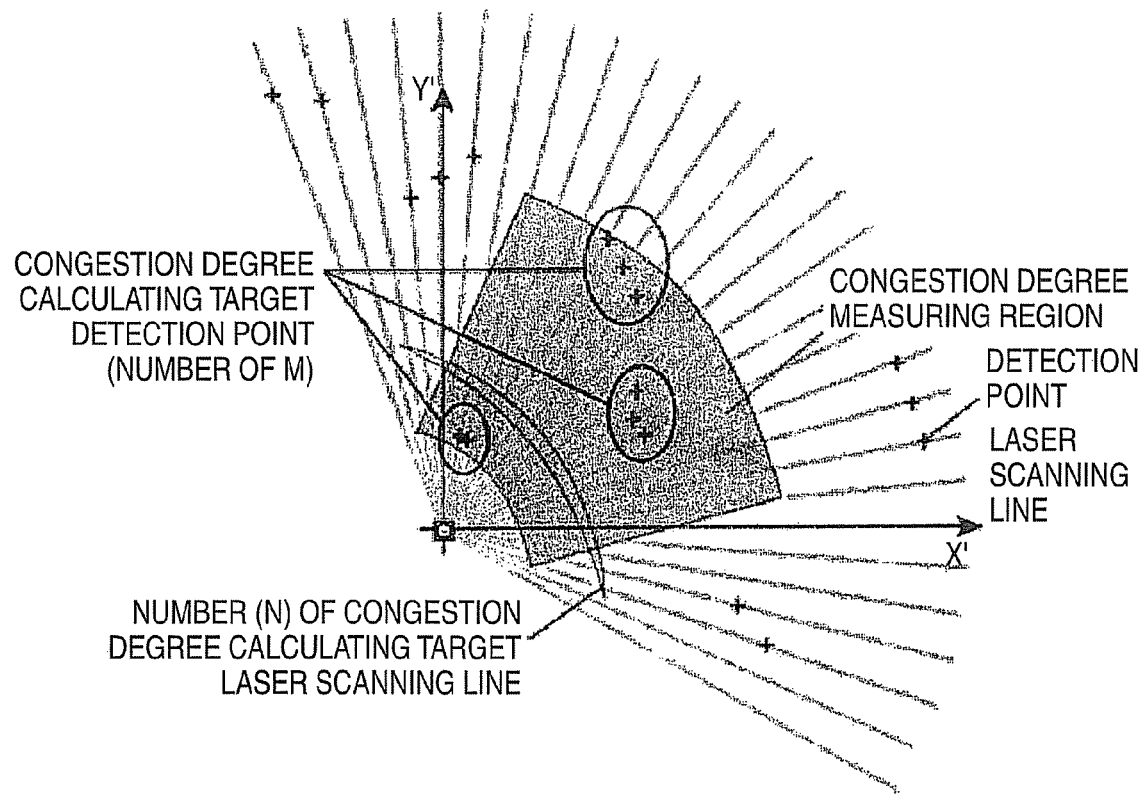
FIG. 14 is a chart for explaining a situation of a congestion degree measurement.

More specifically, in the case in which the number of the scanning lasers of the laser range finder which pass through the inner part of the congestion degree measuring region is represented by N and the number of the scanning lasers detecting the object in the congestion degree measuring region is represented by M (where M≦N) as shown in FIG. 14, a congestion degree C. is obtained by the following equation (7).

$$C = \frac{M}{N} \quad (0 \leq C \leq 1) \quad (7)$$

The congestion degree is regarded to be higher when C approximates to one (Step 306).

Fusing Estimation by Sensor Fusion

Next, the congestion degree is expanded to enable an offset and a nonlinearity to be freely set and a fusing estimation is performed through a sensor fusion.

A fusion ratio $W_1$ to be prepared (Step 307) is expressed by the following equation (8), where α, β, and n are arbitrary constants.

$$W_1 = \alpha C^n + \beta \quad (8)$$

In some cases, the laser range finder can acquire a reflection intensity of the laser at that time together with the measuring distance information. Therefore, an acquirement of reflection intensity data is determined (Step 308). If the reflection intensity data can be acquired, a fusion ratio $W_2$ expressed by the following equation (9), where $\alpha_2$, $\beta_2$, and $n_2$ are arbitrary constants, is generated by using a reflection intensity R in place of the congestion degree in the calculation of the distance information (Step 309).

$$W_2 = \alpha_2 R^{n2} + \beta_2 \quad (8)$$

In calculating a final distance component d that represents a distance to the tracking target, the distance information obtained by the laser range finder and the distance information obtained by the camera may be sensor fused based on the fusion ratio (Step 310) to determine a final distance component d using the following equation (9).

$$d = d_L \cdot W_2 + d_c \cdot (1 - W_2) \quad (9)$$

Similarly, a final azimuth component θ that represents an azimuth to the tracking target is obtained from an azimuth component $\theta_L$ that represents an azimuth to the tracking target obtained by the laser range finder and an azimuth component $\theta_c$ regarding the same tracking target obtained by the camera image processing using the fusion ratio $W_1$ and the following equation (10).

$$\theta = \theta_L \cdot W_1 + \theta_c \cdot (1 - W_1) \quad (10)$$

In an assumed situation, the accuracy and resolution of the distance information obtained through the laser range finder may always be regarded to be more accurate and higher than a stereo parallax. Therefore, it is also possible to use the closest laser measuring distance component to the θ direction.

Figure 15:
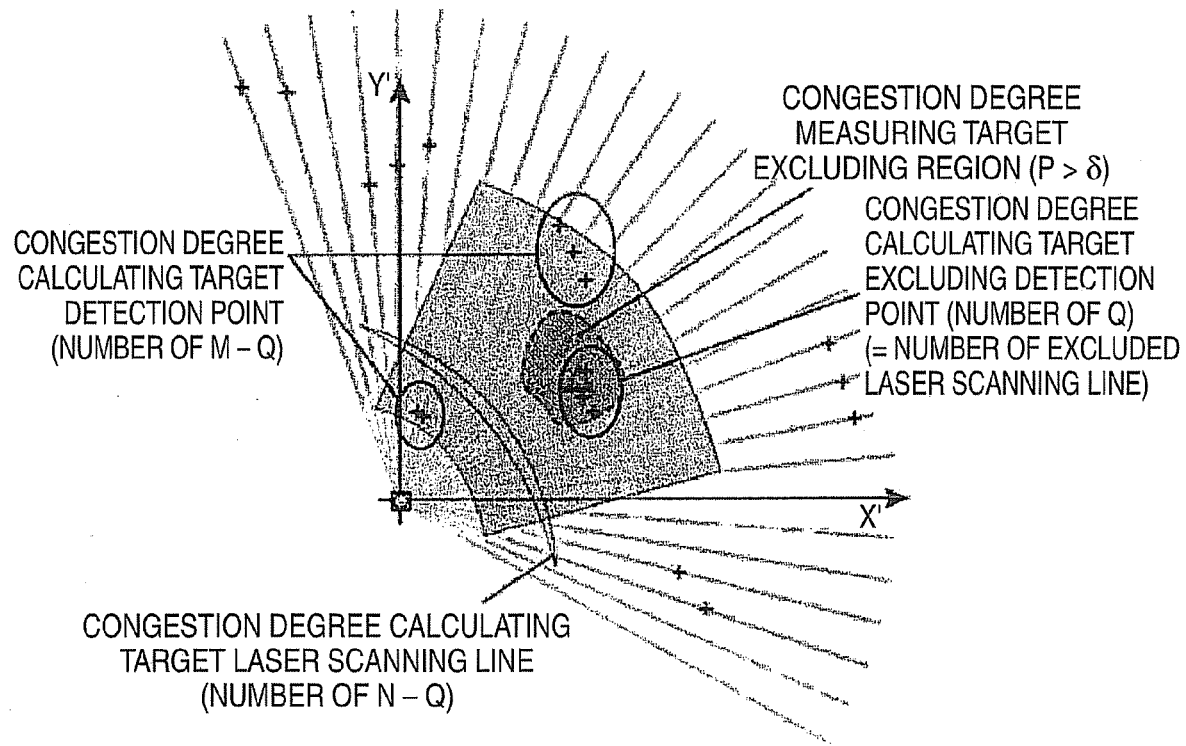
FIG. 15 is a chart for explaining a situation of a congestion degree measurement in which a tracking target is prevented from being mixed.

With reference to FIG. 15, next, description will be given to the prevention of a tracking target from being mixed from the congestion degree measuring region. In the calculation of the congestion degree, the number of laser scanning lines included in the moving object detection region and getting over a moving target candidate point exceeding a certainty degree (a presence probability represented by the Pn or En) which is equal to or larger than a threshold δ(0≦δ≦1) in the moving object detection region is removed from each of the number N of the scanning lasers passing through the inner part of the congestion degree measuring region and the number M of the scanning lasers detecting the object in the congestion degree measuring region (Step 303). By calculating the congestion degree after the Step 306, furthermore, it is possible to prevent the tracking target itself from being included in the congestion degree.

Moreover, the number M of the scanning lasers detecting the object in the congestion degree measuring region can also be obtained by counting the detection points included in the congestion degree measuring region (Step 304) and then removing the detection points having a high possibility of the detection of the tracking target from the count (Step 305), and setting only the congestion degree measuring region including no moving object detection region as a target of the congestion degree calculation.

According to the series of processing described above, it is possible to implement a durable tracking system to an occlusion state in which a moving object to be a tracking target is temporarily hidden behind another object.

Other Embodiments

The moving object detecting device is mounted on the mobile robot 100. The mobile robot 100 calculates a follow-up operation output such as a moving velocity of the mobile robot 100 based on a deviation from moving object estimating position feedback information in the follow-up of the moving object.

Figure 16:
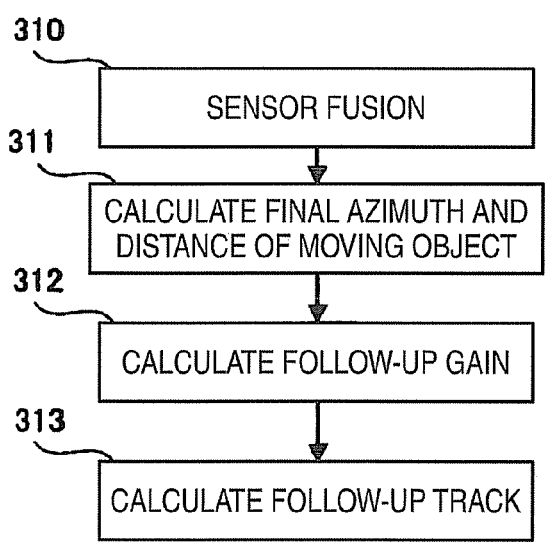
FIG. 16 is a flowchart showing a flow of a follow-up operation of a mobile robot.

As shown in FIG. 16, in the mobile robot 100 according to the embodiment, a feedback loop gain (hereinafter referred to as a follow-up gain) is calculated from the fusion ratios $W_1$ and $W_2$ (Step 312). Based on the follow-up gain, a follow-up track of the mobile robot 100 is calculated and changed dynamically.

More specifically, a follow-up gain G is expressed as $G \propto W_1 W_2$ and is defined to be increased when $W_1$ and $W_2$ are larger, that is, an information weight of the laser range sensor is larger. Consequently, it is possible to output a proper follow-up velocity corresponding to accuracy in estimating position information, thereby performing a stable follow-up operation. Similarly, it is also possible to perform a processing of increasing a cutoff frequency of a low-pass filter used for removing a noise in the generation of deviation information with an increase in the information weight of the laser range sensor.

The present invention is not exactly limited to the embodiment described above, but the components can be modified without departing from the scope thereof in an employment of the present invention. More specifically, although the description has been given by taking, as an example, the mobile robot 100 having the person follow-up function, it is possible to utilize a mobile robot including the same moving object detecting device and method as a dynamic obstacle avoiding function of avoiding a collision with a moving object. The detection and tracking of the moving object in the implementation of the operating function is also included in the scope of the present invention.

By a proper combination of the components disclosed in the embodiment, moreover, it is possible to form various embodiments. For example, some of the components described in the embodiment may be omitted. Furthermore, it is also possible to properly combine the components in the different embodiments.

What is claimed is:

1. A moving object detecting device comprising:
a stereo camera apparatus that takes a set of images of an object and determines a parallax between the object and the stereo camera apparatus;
a range sensor that scans the object and utilizes the parallax to measure a distance from the device to an object;
an image processing component that performs an image processing on the images captured by the stereo camera apparatus to extract a tracking target, which is a moving object to be tracked, from the image and to estimate a distance and a direction from the device to the tracking target based on the image;
a congestion degree measuring component that sets a congestion degree measuring region around a moving object estimated point where a moving object is previously detected and measures a congestion degree represented by a ratio C of the number of detection points detected by the range sensor in the congestion degree measuring region to a total number of scanning lines of the range sensor passing through within the congestion degree measuring region; and
a calculation component that obtains a fusion estimation result by performing a calculation using (a) a first moving object tracking result obtained by an output from the range sensor, (b) a second moving object tracking result obtained by the image processing by the image processing component, and (c) a fusion ratio $W_1$ that is represented by the following expression (1) where $\alpha$, $\beta$, and n are arbitrary constants: (1) $W_1 = \alpha C^n + \beta$.

2. The device according to claim 1, wherein the calculation component obtains a distance measured by the range sensor in the fusion estimating direction as a fusion estimating distance.

3. The device according to claim 1, wherein the first tracking algorithm includes:
setting a moving object detection region around the moving object estimated point obtained in a previous detection step; and
setting detection points obtained by the range sensor to be within the moving object detection region as estimating position candidate points representing a position of the moving object in a current detection step.

4. The device according to claim 3, wherein the first tracking algorithm includes:
setting a region obtained by expanding the moving object detection region by a given distance L outward in a normal direction as the congestion degree measuring region; and
measuring the congestion degree utilizing remaining scanning lines other than scanning lines that are detecting any of the estimating position candidate points having a presence probability exceeding a given threshold value $\delta$, which satisfies $0 \leq \delta \leq 1$, the threshold value $\delta$ being determined in accordance with the position, from among the estimating position candidate points that are within the congestion degree measuring region.

5. The device according to claim 3, wherein, for a case where no estimating position candidate points are detected within the moving object detection region, the first tracking algorithm includes:
setting a prediction position where the moving object is predicted from the previous moving object estimated point as a provisional current estimation position of the tracking target;
adding a lost counter for recording non-detection of the estimating position candidate points; and
continuously performing the tracking of the target object.

6. The device according to claim 5, wherein the first tracking algorithm includes stopping a follow-up operation and transitioning to other operation mode when determined that the tracking target is lost in a case where no estimating position candidate points are detected within the moving object detection region.

7. A mobile robot comprising:
the moving object detecting device comprising:
a stereo camera apparatus that takes a set of images of an object and determines a parallax between the object and the stereo camera apparatus;
a range sensor that scans the object and utilizes the parallax to measure a distance from the device to an object;
an image processing component that performs an image processing on the images captured by the stereo camera apparatus to extract a tracking target, which is a moving object to be tracked, from the image and to estimate a distance and a direction from the device to the tracking target based on the image;
a congestion degree measuring component that sets a congestion degree measuring region around a moving object estimated point where a moving object is previously detected and measures a congestion degree represented by a ratio C of the number of detection points detected by the range sensor in the congestion degree measuring region to a total number of scanning lines of the range sensor passing through within the congestion degree measuring region; and
a calculation component that obtains a fusion estimation result by performing a calculation using (a) a first moving object tracking result obtained by an output from the range sensor, (b) a second moving object tracking result obtained by the image processing by the image processing component, and (c) a fusion ratio $W_1$ that is represented by the following expression (1) where $\alpha$, $\beta$, and n are arbitrary constants: (1) $W_1 = \alpha C^n + \beta$;
a drive component that drives the robot to move on a floor; and
a controller that controls the drive unit to move the robot to follow the tracking target by referring to a tracking target estimating position that is obtained as the fusion estimation result by the calculation unit of the moving object detecting device,
wherein the calculation component dynamically changes a follow-up gain G for tracking the tracking target to satisfy the following equation (2), where R ($0 < R < 1$) represents a reflection intensity of a scanning beam of the range sensor, and second fusion ration $W_2$ satisfies the following equation (3), where $\alpha_2$, $\beta_2$, and $n_2$ are arbitrary constants:

$$G \propto W_1 W_2 \tag{2}$$

$$W_2 = \alpha_2 R^{n_2} + \beta_2. \tag{3}$$

* * * * *